UNITED STATES PATENT OFFICE.

PAUL R. HERSCHMAN, OF FREEPORT, ILLINOIS, ASSIGNOR TO CHAS. L. KIEWERT COMPANY, OF MILWAUKEE, WISCONSIN.

PAINT.

No. 822,947.

Specification of Letters Patent.

Patented June 12, 1906.

Application filed November 3, 1905. Serial No. 285,684.

*To all whom it may concern:*

Be it known that I, PAUL R. HERSCHMAN, a citizen of the Empire of Austria-Hungary, residing at Freeport, in the State of Illinois, have invented a new and useful Composition of Matter to be Used as a Paint, of which the following is a specification.

This new paint is a product of a novel combination of ingredients, and is especially adapted to be employed as a paint on vessels or articles that are to be exposed to salt or salt water, as it will not saponify by contact therewith or by any action of salt thereon, and the paint also resists the action of acids and alkali bases, and is therefore an adequate protection on articles against the action of acids and of alkali bases, as well as against salt or salt water.

The new composition consists of approximately one hundred pounds of coal-tar, three pounds of peroxid of manganese, ($MnO_2$,) twenty pounds of hydraulic cement, and twenty pounds of black or carbonaceous alkaline residuum of the dry distillation of shale-oil. These ingredients are to be mixed and heated to approximately 250° Fahrenheit for four hours, resulting in my new product, or instead of the hydraulic cement and black or carbonaceous residuum of the dry distillation of shale-oil of the above composition there may be substituted as an equivalent therefor five pounds of sulfur. This is to be heated as required for the former composition of materials.

The thus produced composition will for use as a paint require to be thinned by a vehicle—such as turpentine, benzin, or similar material—to such extent as to reduce the composition to a sufficiently fluid condition for application as a paint. The paint will be highly glossy and very enduring.

What I claim is—

1. A composition for paint, consisting of coal-tar, peroxid of manganese, cement, and carbonaceous alkaline residuum of the dry distillation of shale-oil, substantially as set forth.

2. A composition for paint, consisting of one hundred pounds of coal-tar, three pounds of peroxid of manganese, twenty pounds of cement and twenty pounds of carbonaceous alkaline residuum of the dry distillation of shale-oil, combined and treated as set forth.

In testimony whereof I affix my signature in presence of two witnesses.

PAUL R. HERSCHMAN.

Witnesses:
C. T. BENEDICT,
ALMA A. KLUG.